Oct. 19, 1926.  
R. F. HALL  
AIRPLANE  
Filed April 21, 1925  
1,603,688  
2 Sheets-Sheet 2
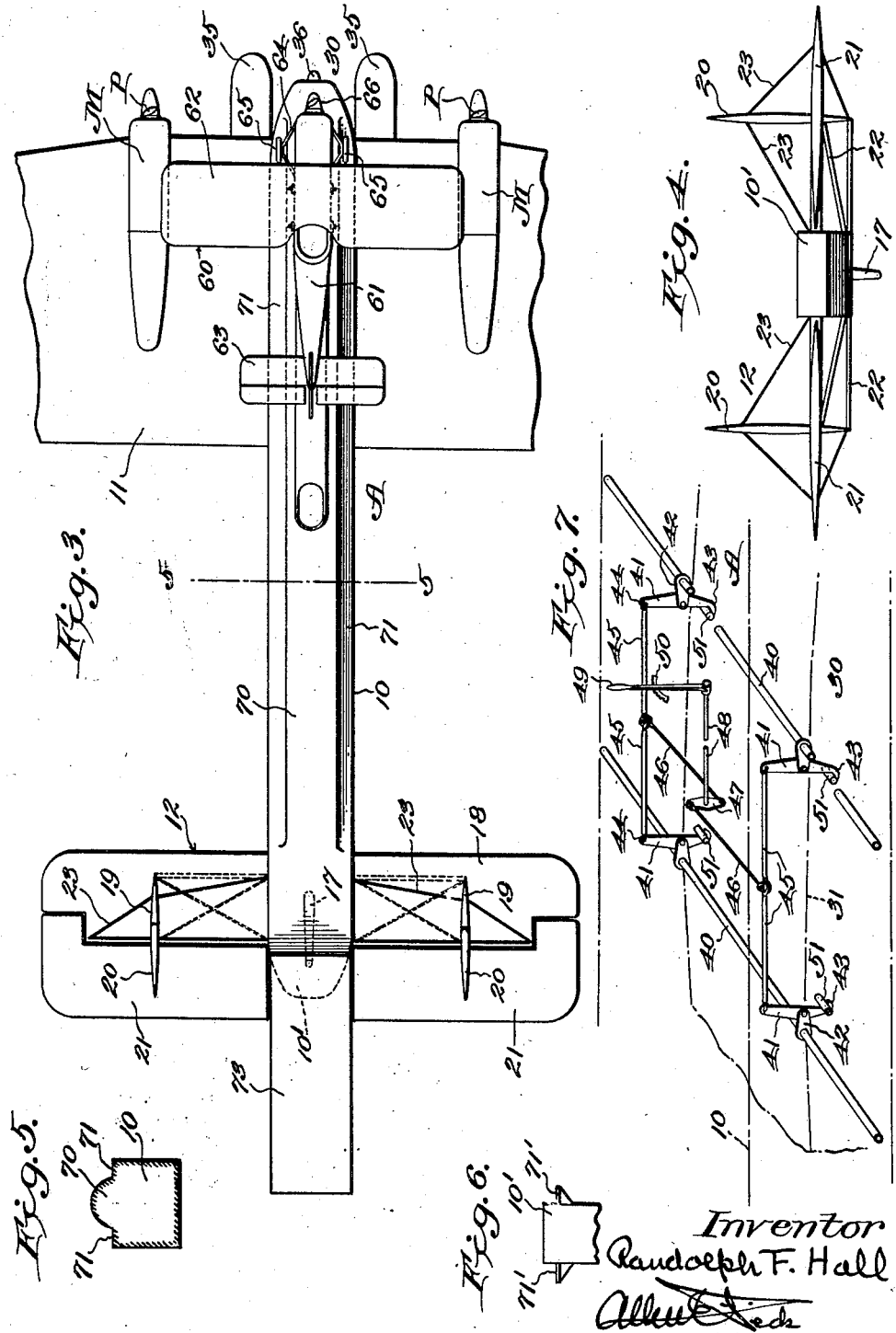

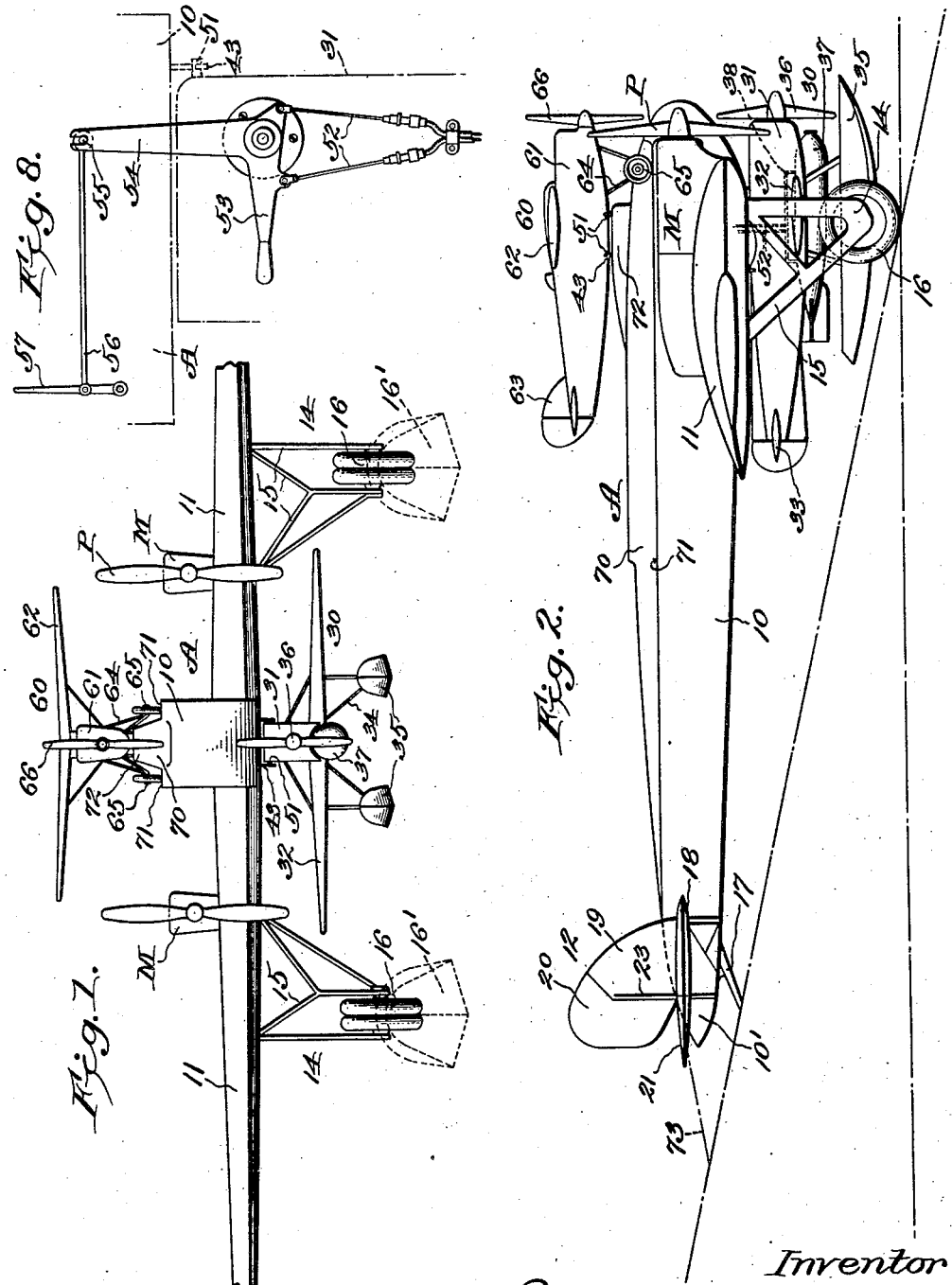

Patented Oct. 19, 1926.

1,603,688

UNITED STATES PATENT OFFICE.

RANDOLPH F. HALL, OF ITHACA, NEW YORK, ASSIGNOR, BY DIRECT AND MESNE ASSIGNMENTS, OF ONE-FOURTH TO PAUL WILSON, OF ITHACA, NEW YORK, AND ONE-FOURTH TO THEODORE P. HALL, OF WALLINGFORD, CONNECTICUT.

AIRPLANE.

Application filed April 21, 1925. Serial No. 24,764.

This invention relates to certain improvements in airplanes; and the nature and objects of the invention will be readily recognized and understood by those skilled in the arts involved in the light of the following explanation and detailed description of the accompanying drawings illustrating what I at present consider to be the preferred embodiments or aerodynamical and mechanical expressions of the invention from among various other forms, arrangements, combinations and constructions of which the invention is capable within the spirit and scope thereof.

The invention deals primarily with the design of mother aircraft for carrying and transporting powered auxiliary airplanes thereon and therewith, and to the design and mounting of the auxiliary airplanes on the mother craft; and more particularly the invention is directed to the provision of a mother craft and auxiliary powered airplanes detachably mounted thereon to form a mobile attack and bombing unit for carrying out long range attack and bombing maneuvers in military and naval operations, although the invention is not limited to military and naval operations but is capable of other adaptations and use for various other purposes, as will be more fully explained hereinafter.

In warfare, aerial bombing and attack raids or expeditions particularly at long range where the objective is a considerable distance from the base, are generally carried out by employing airplanes of the large types having high load capacity for bombs, crew and armament. Such airplanes are necessarily at low speed with minimum maneuver ability and are subject to successful attack from the air and open to attack by anti-aircraft fire, particularly when at low altitudes, so that bombing operations are usually done at high altitudes to lessen the effect of surface gun fire, with resulting decrease in the accuracy and effect of the bombing at the objective. Air defense for such types of large bombing and attack airplanes, when provided, is by way of escort by small, high speed pursuit or fighting airplanes, but such an escort is not always in position to repel sudden air attacks upon the bombing airplanes.

A fundamental characteristic of the present invention resides in the provision of an airplane of the relatively large type designed to form a mother craft, with a powered auxiliary bomb carrying airplane mounted thereon and carried thereby for release from the mother craft during flight for independent flight and transportation of the bomb carried thereby to the objective upon which the bomb is to be dropped, so that the mother craft and auxiliary airplane can be flown as a unit on a course at which danger of attack is at a minimum, to a position near the objective, where the auxiliary airplane can be released for independent flight to and discharge of the bomb onto the objective with minimum possibility of successful attack by air or from surface gun fire, due to the auxiliary airplane being of the small, readily maneuverable comparatively high speed type.

A further main characteristic of the invention consists in the mounting of a relatively small, high speed auxiliary airplane or airplanes on the mother ship for release therefrom in flight, to provide a defense against air attack on the mother craft, such an auxiliary airplane being released to engage attacking craft and permit completion of the flight of the mother craft with the bombing auxiliary airplane.

An object of the invention is to provide a design and mounting of motor craft and detachable auxiliary bomb or other weight transporting auxiliary airplane carried thereby, such that in mounted, attached position of the auxiliary airplane the weight thereof is so distributed to the mother craft that the balance and equilibrium thereof is maintained and the combined structure forms an efficient aerodynamical unit.

Another object of the invention is to provide a mother craft and bomb or weight transporting auxiliary airplane detachably mounted thereon for flight therewith, with mechanism operable either from the motor craft or from the auxiliary airplane for releasing the bomb carried by a latter, so that the auxiliary airplane can be detached from the mother craft for independent flight and the bomb released during such flight of the auxiliary airplane, or the bomb released during flight of the mother craft and auxiliary airplane mounted thereon to form the combined structure or unit, Another object of the invention is to provide improved mechanism for detachably mounting an auxiliary airplane on and to a mother craft for release therefrom during flight of the combined structure.

Another object of the invention is to provide a design of mother craft and auxiliary airplane detachably mounted thereon for flight therewith and release therefrom, in which the mother craft forms and provides the supporting track or runway for receiving the auxiliary airplane and guiding the same to position in mounting the auxiliary airplane on the mother craft.

Another object of the invention is to provide a design and mounting arrangement of mother craft and auxiliary airplanes detachably carried thereby for which one of the auxiliary airplanes carries a bomb or other releasable weight, and another of the auxiliary airplanes is of the relatively high speed low load type, such that the combined structures present an aerodynamical unit having balance and efficiency in flight and the mother craft retains its balance upon release of any or all of the auxiliary airplanes in flight.

With the foregoing main objects, and certain other objects and results in view, which other objects and results will be readily apparent to those familiar with this art from the following explanation, the invention consists in certain novel features in construction and in combinations and arrangements of elements, as will be more fully and particularly referred to and specified hereinafter.

Referring to the accompanying drawings:

Fig. 1, is a view in front elevation of a design of mother craft of the airplane type and auxiliary airplanes, embodying the invention, with the auxiliary airplanes detachably mounted on the mother craft, one of the auxiliary airplanes formed to carry a bomb and the other providing a defense craft, in position for flight therewith or release therefrom, in accordance with the invention.

Fig. 2, is a side elevation of the mother craft and auxiliary airplanes mounted thereon, as shown by Fig. 1.

Fig. 3, is a view in top plan of the mother craft and auxiliary airplanes of Fig. 1, showing particularly the design of the mother craft fuselage to form the mounting and supporting runway for the auxiliary airplane thereon.

Fig. 4, is a view in rear elevation of the tail assembly or empennage of the mother craft.

Fig. 5, is a sectional view, more or less diagrammatical, taken on line 5—5 of Fig. 3, through the fuselage of the mother craft.

Fig. 6, is a view, more or less diagrammatical, of a modified design of fuselage runway, for supporting and mounting an auxiliary airplane on the fuselage.

Fig. 7, is a diagrammatical view in perspective of a form of attaching and release mechanism for detachably maintaining the auxiliary airplanes on and to the mother craft.

Fig. 8, is a view of the bomb release operating mechanism for releasing the bomb carried by the auxiliary airplane suspended below the mother craft body, and arranged for operation either from the mother craft or from the auxiliary airplane.

A mechanical and aerodynamical expression of the invention is disclosed and described here with purely by way of example and not of limitation, to present and exemplify the principles and features of the invention, so as to enable those skilled in the art to understand the same. In the disclosed embodiment, referring now to the accompanying drawings, the mother craft A takes the form of a relatively large airplane or heavier-than-aircraft, embodying the body or fuselage 10, thick section monoplane supporting surface or wing 11, tail assembly or empennage 12, and the landing gear or chassis 14. The wing 11 is of the cantilever, internally braced type and extends from the opposite lower sides of the fuselage 10, so that the fuselage is disposed and extends a distance upwardly above the wing, as will be clear by reference to Figs. 1 and 2. Power units M having tractor propellers P are mounted in the usual stream line nacelles on the upper surface of wing 11 at opposite sides of the fuselage 10, and form the propelling means for the mother craft A.

The landing gear or chassis 14, is in the present instance, of the land type and comprises the spaced trusses 15 depending from the lower or under side of wing 11 at opposite sides of fuselage 10 and disposed outwardly from the power units M, respectively, with elements of each truss 15 extended inwardly and upwardly to points below the power unit M, respectively adjacent thereto, so that the weight of units M is distributed to the trusses 15 of the chassis under certain conditions. In the lower end of each truss 15 of chassis 14, landing wheels 16 are mounted in the usual or any desired manner familiar in the art, and in the example hereof are of the double or wide tread type. At the tail or rear end of the fuselage 10 any suitable tail skid 17 is mounted (see Fig. 2) for supporting the tail of the fuselage with the craft A on the ground. The arrangement of chassis trusses 15, is such that a very wide, broad tread is secured for the relatively large mother craft A, with a wide, uninterrupted space between the chassis trusses 15 beneath the fuselage 10 and central portion of the wing 11, for a purpose hereinafter described.

The tail assembly or empennage 12 of the mother craft A is mounted in the usual manner at the rear end of fuselage 10 and consists of the horizontal stabilizer surface or planes 18, vertical stabilizers or fins 19, rudders 20, and elevators 21. Fuselage 10 extends and terminates rearwardly without substantial reduction in width, in the particular embodiment hereof, and the planes 18 providing the horizontal stabilizer surface extend from opposite sides of the tail end of the fuselage below and leaving the upper surface thereof exposed and uninterrupted thereby. The elevators 21 are of the balanced type pivotally mounted along the trailing edges of the stabilizers 18, respectively, and terminate spaced apart at their opposite inner ends a distance substantially equal to the width of the tail end of fuselage 10, as shown by Figs. 3 and 4 of the drawings. If desired a streamline shell or fairing 10' is mounted on the tail end of the fuselage 10 in rearward continuation thereof. The stabilizers 18 are suitably braced or supported by trusses 22 from the undersides thereof to the fuselage, in the usual manner.

The vertical stabilizers or fins 19 are mounted on the stabilizers 18 and suitably braced by wires or the like 23 from the opposite sides thereof, and these fins are spaced apart from opposite sides of the fuselage in position behind and substantially alined with the longitudinal axis of the power units M, respectively. The rudders 20 are pivotally mounted in vertical position extending rearwardly from the trailing edges of fins 19, and thus the vertical fins and rudders are so disposed as to provide a space there between substantially equal in width to the space between power units M on wing 11, with the space uninterrupted from fin to fin above brace wires 23 (see Fig. 4). By the foregoing design and arrangement of mother craft A, an uninterrupted space is provided along and on each side of fuselage 10 thereabove from nose to tail thereof.

The design and embodiment of the mother craft A above described, presents an airplane of the relatively large multi-motored, monoplane type for land operations, although the invention is not limited to the type disclosed, as will be readily apparent. Where it is desired or found expedient to operate the mother craft A for landing on and taking off from water, suitable pontoons 16' or displacement gear indicated by dotted lines in Fig. 1, can be substituted in place of the ground wheels 16 carried by chassis trusses 15.

An auxiliary airplane 30, in the example hereof designed for bomb carrying, is mounted in position detachably suspended below and from the forward portion of the fuselage 10 of mother craft A, in the space formed between the chassis trusses 15, as clearly shown in Figs. 1 and 2 of the accompanying drawings. The auxiliary bomb carrying airplane 30 is of the monoplane type and embodies the fuselage 31, monoplane wing 32 of the low type extending from the lower portion of fuselage 31, empennage 33 (see Fig. 2) and chassis 34 consisting of spaced trusses depending from wing 32 and having the pontoons 35 carried thereby in the usual manner familiar in the art. The auxiliary airplane 30 is powered for independent flight by any suitable or desired power plant (not shown) driving a tractor propeller 36. The design of auxiliary airplane 30 provides for mounting and carrying a bomb 37 along the longitudinal axis thereof beneath fuselage 31 for release therefrom and any conventional or other form of bomb rack and release mechanism 38, indicated diagrammatically by dotted lines in Fig. 2 of the drawings is provided for this purpose. In mounted position, the auxiliary airplane 30 with its bomb load 37, is disposed and positioned suspended beneath the fuselage 10 of the mother craft along the fore and aft or longitudinal axis thereof, so that the weight of the auxiliary airplane is distributed to the mother craft at such points as to not interfere with or disturb the balance of such craft, and permit of release of the auxiliary airplane in position to gather flying speed or increase its speed by diving when released from the moter craft. In order to augment the efficiency of the combined structure with the auxiliary airplane 30 mounted on mother craft A, the wing 32 is preferably disposed in aerodynamic relation with respect to the mother craft wing 11 thereabove and serves as an additional lift surface aiding in sustaining the added weight of airplane 30. To further increase the performance of the combined structures, the power of auxiliary airplane 30 is utilized to drive propeller 36 and thus provide an additional power unit for the mother craft when carrying the auxiliary airplane. It will be noted that the auxiliary bomb carrying airplane 30 is not restricted to a chassis of the water type as shown, but is intended to be equipped with a land type chassis where desired or found expedient.

In Fig. 7 of the drawings a possible design and arrangement of mechanism for detachably mounting the auxiliary airplane 30 in desired position on the mother craft A, is more or less diagrammatically disclosed. Spaced, substantially parallel rods or cross members 40 are disposed transversely of the mother craft fuselage 10 at the lower or under side thereof and may form elements of the fuselage frame if desired. These cross members 40 are in the example hereof positioned on the forward portion of fuselage 10 substantially in line with the wing 11. Each cross member 40 is provided with a spaced pair of cranks 41 pivotally mounted in vertically disposed position intermediate their ends, on brackets or the like 42 fixed to or forming parts of the cross members, with the pairs of brackets extended towards each other from the opposite pairs of cranks 41 in fore and aft alinement with each other. Cranks 41 depend downwardly below fuselage 10 and are formed at the lower ends to provide hooks 43, the hooks of each pair of cranks extending toward the hooks of the opposite pair of cranks respectively alined therewith, so that the pair of hooks 43 on forward member 40 extend rearwardly and the hooks on rear member 40 extend forwardly, with respect to fuselage 10. The opposite aligned levers 41 of each pair on the members 40 are connected at their upper ends by universal couplings 44 to the opposite ends of pivoted rods 45.

The pivoted rods 45 between the alined levers 41, respectively are each connected at their pivotal point to a link 46 disposed transversely thereof and extended inwardly therefrom to a vertically disposed crank 47 mounted on a rock shaft 48 intermediate the opposite pivoted rods 45 and disposed in a fore and aft direction on fuselage 10. The inner adjacent ends of the opposite links 46 are pivotally connected to the opposite free, upper and lower ends, respectively, of crank 47. Any suitable arrangement of operating lever or levers for rocking shaft 48 and crank 47 is provided and in the illustrated example embodies the hand lever 49 fixed to shaft 48 and disposed at any desired points in fuselage 10 for operation by the pilot or other occupant of the mother craft A. Lever 49 is provided with lock means 50 for detachably securing the same in desired position against accidental movement or displacement. With the mechanism as described, by moving lever 49 laterally in the proper direction, shaft 48 and crank 47 are rocked and through links 46 the pivoted rods 45 are drawn inwardly toward each other which causes the cranks 41 to swing the lower hook portions 43 thereof outwardly away from each other, while a reverse movement of lever 49 will swing hooks 43 inwardly toward each other to normal position.

The auxiliary bomb carrying airplane 30 is provided with members for engagement by hook levers 43 of the mother craft A, to detachably mount and secure the airplane 30 to the mother craft, and these members in the present embodiment take the form of pins or studs 51 extending laterally from opposite sides of the auxiliary airplane fuselage 31 adjacent the upper edges or side thereof. The studs 51 are disposed in spaced pairs, one pair on each side, of fuselage 31 with the studs of opposite pairs in longitudinal alinement, respectively, transversely of the fuselage. Studs 51 are so arranged and spaced on the opposite sides of fuselage 31 as to be received and engaged by depending hooks 43 in normal position of levers 41, with the auxiliary airplane 30 in mounted position on the mother craft. The auxiliary airplane 30 is mounted in position beneath mother craft fuselage 10, by elevating airplane 30 to bring the studs 51 thereof in position to be engaged by hooks 43 on the fuselage 10, these hooks being swung to outward or stud releasing position and then operating lever 49 to swing hooks 43 inwardly to normal position engaging and receiving the studs 51, as shown in Fig. 7. The auxiliary airplane 30 is then secured in position suspended beneath fuselage 10 and supported and held in this position by the hooks 43 and studs 51. When it is desired to detach and release auxiliary airplane 30 from mounted position on the mother craft A, lever 49 is operated to swing hooks 43 outwardly from each other out of position beneath and engaging studs 51, whereupon airplane 30 is completely detached from the mother craft and drops downwardly therefrom. If desired the release mechanism for the auxiliary airplane 30 can be arranged for operation either from the mother craft or from the auxiliary airplane, as will be readily apparent.

In order to permit of either releasing the bomb load 37 carried by the auxiliary airplane 30 from the mother craft A with airplane 30 mounted thereon, or from the auxiliary airplane in independent flight or mounted on the craft A, the invention provides a bomb release operating mechanism operable from the mother craft for actuating the bomb release mechanism 38 (see Fig. 2) of airplane 30. Referring now to Figs. 2 and 8 of the drawings, the bomb rack and release mechanism 38 is diagrammatically shown to indicate the conventional types of such mechanism having the operating cables 52 extending therefrom to the hand lever 53 mounted in fuselage 10 of airplane 30 at any convenient point for operation by an occupant thereof. Hand lever 53 is mounted for rocking movement to actuate operating cables 52, in the usual manner, and the invention provides such lever with a vertically disposed arm 54 (see Fig. 8) extending upwardly into the fuselage 10 through a suitable opening therein, with airplane 30 in mounted position on mother craft A. The upper end of arm 54 is slotted to receive a pin 55 on the end of a pull rod 56 mounted within fuselage 10 and extending to and operatively connected with a hand lever 57 at any desired point on mother craft A. By swinging lever 57, the lever 53 on airplane 30 is operated to actuate the cables 52 of the bomb release mechanism 38, through rod 56 and arm 54, thus permitting release of bomb 37 from a point on the mother craft A, or by swinging lever 53 from airplane 30 the bomb can be released, as will be readily understood. When airplane 30 is released from mother craft A, arm 54 drops out of engagement with pin 55 and rod 56 carried by the mother craft, and when airplane 30 is mounted on mother craft A, arm 54 extends upwardly into fuselage 10 and pin 55 of rod 56 fits down into the slotted upper free end thereof and operatively couples the lever 57 with the bomb release mechanism.

The invention provides for detachable mounting and carrying of an additional auxiliary airplane 60 along the fore and aft or longitudinal axis of the mother craft A, on the upper side of the fuselage 10 above wing 11. This auxiliary airplane 60 in the embodiment of the invention presented herewith is intended for defense purposes and is of the relatively high speed pursuit or fighter type having fuselage 61, high or parasol type monoplane wing 62, empennage 63, and landing gear or chassis 64 of the split-axle type including the wheels 65. Airplane 60 is powered by any desired power plant (not shown) driving a tractor propeller 66. While airplane 60 is shown as of the land type, it can if desired be of the water type or the amphibian type, although the inclusion of wheels or rollers in the landing gear is preferable where the design will permit of their inclusion, as will be more fully referred to hereinafter.

The fuselage 10 of the mother craft A is so formed and designed as to provide a supporting and mounting track or runway for the auxiliary airplane 60. The upper side of the fuselage 10 is formed with the central, longitudinally disposed elevated or raised section 70 extending from the nose or forward end of the fuselage and inclined rearwardly to and merging into the tail of the fuselage, and providing the opposite parallel tracks or runways 71 on the outer sides of and below the raised section 70. At the forward end of section 70 an elevated base 72 is provided for mounting and receiving the detachable mounting mechanism for attaching airplane 60 in mounted position on the fuselage 10. The runways 71 are spaced apart, that is elevated section 70 is of such a width as to permit the landing gear 64 of airplane 60 to fit over or straddle section 70 with the wheels 65 received by and bearing on the runways and the sides of section 70 forming retaining guides for the airplane 60 against lateral displacement from the fuselage. At the tail end of fuselage 10, a removable inclined platform or ramp 73 (see Figs. 2 and 3) is provided for mounting airplane 60 from the ground onto fuselage 10, one end of platform 73 being placed on the ground and the other end on the rear end of fuselage 10. Platform 73 can, if desired, be carried at any desired point on the mother craft A when not in use for mounting or removing the auxiliary airplane 30.

In mounting auxiliary airplane 60 from the ground into position on the mother craft fuselage 10, platform 73 is placed in position at the tail end of the fuselage and airplane 60 is rolled thereon and upwardly thereover onto the fuselage 10 with the wheels 65 on runways 71, and then forwardly along the fuselage to position over base 72 between the power units M at the forward or nose end of the mother craft fuselage 10. The arrangement and spacing of the vertical surfaces 19 and 20 of the mother craft empennage 12 is such that the auxiliary airplane 60 with wing 62 thereof will pass freely therebetween without interference, while at the forward end of the fuselage the spacing and depth of power units M will not interfere with airplane 60 or wing 62 which is above and clears such units in mounted position of auxiliary airplane 60. In mounted position of airplane 60 on the forward end of fuselage 10, it is maintained in substantially normal flying attitude for release and independent flight from the mother craft A, with the supporting surface or wing 62 thereof functioning aerodynamically to contribute in the support of the weight of the auxiliary airplane in the combined structures during flight. It will be noted that the loads imposed on the mother craft A by the auxiliary airplane 60 in mounted position thereon, are applied substantially along the longitudinal axis of the mother craft so that the balance thereof is not interfered with. If desired the power unit and propeller 66 driven thereby, of airplane 60 can be employed as an additional power unit for the mother craft A with the airplane 60 mounted thereon and aerodynamically combined therewith.

In Fig. 6 of the accompanying drawings, a more or less diagrammatical transverse section through a mother craft fuselage 10' of the relatively narrow or stream-lined type, is shown. With such type of fuselage where the width thereof will not permit of the formation of the auxiliary airplane mounting runway thereon in the manner of fuselage 10, the invention provides exterior runways 71' mounted on and extending laterally from opposite sides of fuselage 10' for receiving the chassis wheels 65 of the auxiliary airplane. These exterior runways 71' can be suitably braced and supported from the fuselage 10' to care for the loads imposed thereon by the auxiliary airplane.

Any suitable mechanism can be utilized for releasably securing and mounting auxiliary airplane 60 in position on the forward part of fuselage 10 above the mounting base 7, but is preferably the hereinbefore described arrangement and construction of mechanism employed for detachably suspending the auxiliary airplane 30 beneath the fuselage 10. In the adaptation of such mechanism for the detachable mounting and securing of airplane 60 on the upper side of fuselage 10, the rods 40 are disposed across the upper side thereof within base 72, and the cranks 41 are reversed in their position thereon with the hooks 43 thereof extending upwardly above base 72, and the operating mechanism embodying rods 45, links 46, crank 47, shaft 48, and hand lever 49, reversed to assume a position within base 72, with lever 49 disposed at any convenient point for operation from fuselage 10, as will be readily understood by reference to Figs. 1, 2 and 3, of the drawings, in connection with Fig. 7 and the explanation thereof. Auxiliary airplane 60 is provided with the studs 51 extending from opposite sides of fuselage 61, adjacent the lower side thereof for engagement by hooks 43 to detachably secure airplane 60 in mounted position, in a manner similar to that described with reference to the detachable mounting of auxiliary airplane 30. By operating lever 49 in fuselage 10, hooks 43 extending upwardly from base 72 on the fuselage, are withdrawn from engagement with studs 51 on fuselage 61 of airplane 60, thus releasing this auxiliary airplane for independent flight from the mother craft A during flight of the combined mother craft and auxiliary airplane.

The mother craft A with a bomb carrying auxiliary airplane 30 and the auxiliary defense airplane 60 detachably mounted and secured in position thereon along the longitudinal or fore and aft axis of the mother craft, forms, in the embodiment hereof, a bombing unit particularly intended for carrying out military and naval operations. In such operations, for example against an attacking ship off a coast to be defended, the mother craft with the auxiliary airplanes thereon is flown from a land or water base to a position above the attacking ship, whereupon the bomb carrying auxiliary airplane 30 is released and dives onto its objective, the ship, releasing its bomb thereon at low altitudes for greater accuracy. Due to the small size and relatively high speed of the auxiliary airplane 30, it is not vulnerable to gun fire from the ship and is capable of withstanding attack from enemy aircraft. After release of its bomb load its speed and maneuver ability are materially increased and it can return to the mother craft or some other point, such as an attending surface ship. If the mother craft is attacked by enemy aircraft en route to the objective, the auxiliary fighting airplane 60 is released to engage such craft and permit the mother craft to proceed to the objective with the auxiliary airplane 30. In operations over land the mother craft can proceed to the objective at high altitudes to reduce the effect of surface gun fire, while auxiliary airplane 60 serves as a defense craft against enemy airplane attack.

The invention also lends itself to commercial uses, as well as military, in which event the auxiliary releasable weight carrying airplane 30 is employed for making local descents for discharge of cargo from the mother craft which is travelling a non-stop route between distance points as well as discharge of passengers by making landings at local or intermediate points. Similiarly, the auxiliary airplane 60 can be so employed, as will be readily understood. Hence, at this point attention is directed to the fact that wherever the term "bomb" or "bomb carrying" appears in the appended claims, it is used and intended to include any releasable or detachable weight or cargo carried by the auxiliary airplanes.

The mounting and arrangement of the auxiliary airplanes 60 and 30 above and below the mother craft fuselage 10 along the longitudinal axis of the mother craft with the auxiliary airplanes in aerodynamical relation with the mother craft, presents a combined structure of stability and efficiency in flight, and permits of release of one or all of the auxiliary airplanes without disturbing the balance and efficiency of the remaining structures. The mother craft is shown herewith as a monoplane but it is not intended to limit the invention to such type, as a multiplane or other type may be used to form the mother craft.

The auxiliary airplane 30 detachably suspended below fuselage 10 of the mother craft A, in the embodiment disclosed is positioned with the wing 32 thereof between the spaced trusses 15 of the chassis 14, but where it is desired to provide the mother craft with a chassis having a tread of width less than the span of the auxiliary airplane wing, the auxiliary airplane can be mounted with the wing thereof forward of the mother craft chassis, or to the rear thereof. With the auxiliary airplane 60 mounted above and on the mother craft fuselage the runways formed by the mother craft fuselage can be employed as a takeoff and landing runway, as will be readily understood. In the example hereof the airplane 60 is mounted at the forward end of the fuselage runway but where it is desired to use the fuselage as a take-off runway, airplane 60 is preferably mounted in position a distance rearwardly on the mother craft fuselage.

It is evident that various changes, modifications, variations and substitutions might be resorted to without departing from the spirit and scope of the invention and hence I do not desire to limit myself to the exact and specific disclosures hereof.

Desiring to protect my invention in the broadest manner legally possible, what I claim is:

1. In combination, a mother aircraft having a landing chassis formed with spaced elements, and an auxiliary airplane mounted on the mother aircraft in position between the spaced chassis elements.

2. In combination, a mother aircraft having a landing chassis formed with spaced landing elements, and a powered auxiliary airplane detachably mounted on the mother aircraft along the longitudinal center thereof between said spaced landing elements.

3. In combination, a mother aircraft having a landing chassis embodying landing elements disposed at opposite sides of the longitudinal center of the mother aircraft, and an auxiliary airplane detachably mounted on the mother aircraft along the longitudinal center thereof between said chassis elements.

4. In combination, a mother airplane having a landing chassis embodying trusses at opposite sides of and spaced from the longitudinal center of the mother airplane, said trusses depending from the mother airplane and providing a downwardly open space therebetween, and an auxiliary airplane detachably mounted on the mother airplane along the longitudinal center thereof in position between said chassis trusses for passage through the space therebetween upon release from the mother airplane.

5. In combination, a mother airplane, a powered auxiliary bomb-carrying airplane detachably mounted on the mother airplane for release and independent flight, and mechanism for releasing a bomb carried by said auxiliary airplane in mounted position operable from the mother airplane or from the auxiliary airplane.

6. In combination, a mother aircraft, a powered auxiliary bomb carrying aircraft detachably mounted on and carried by the mother craft for release and flight therefrom, and mechanism for releasing a bomb carried by the auxiliary aircraft operable from the mother craft or from the auxiliary aircraft.

7. In combination, a mother airplane, an auxiliary bomb carrying airplane detachably mounted on the mother airplane for release and flight therefrom, bomb carrying and release mechanism on the auxiliary airplane, control means for said release mechanism operable from the auxiliary airplane and control means for the release mechanism carried by the mother airplane and detachably coupled with the auxiliary airplane control means in mounted position of the auxiliary airplane, whereby said bomb release is controlled either from the auxiliary airplane or from the mother airplane.

8. In a mother airplane, a fuselage, an empennage mounted at the tail end thereof and including spaced vertical control surfaces, said fuselage formed with and mounting runway disposed longitudinally therealong for receiving and mounting an auxiliary airplane, and the vertical control surfaces of the empennage spaced apart to permit passage of an auxiliary airplane therebetween in mounting the same on said runway.

9. In a mother airplane, a mounting runway for receiving and mounting an auxiliary airplane thereon, said runway disposed longitudinally along the fuselage, and a removable platform constructed and arranged to be mounted extending from the tail end of the fuselage to the ground to form a continuation of the fuselage runway to permit of mounting an auxiliary airplane on the fuselage.

Signed at Ithaca, New York, this 13th day of April, 1925.

RANDOLPH F. HALL.